Oct. 21, 1958  A. M. COMPTON  2,857,170
LIGHT WEIGHT SPREAD TANDEM RUNNING GEAR
Filed Oct. 1, 1956  2 Sheets-Sheet 1
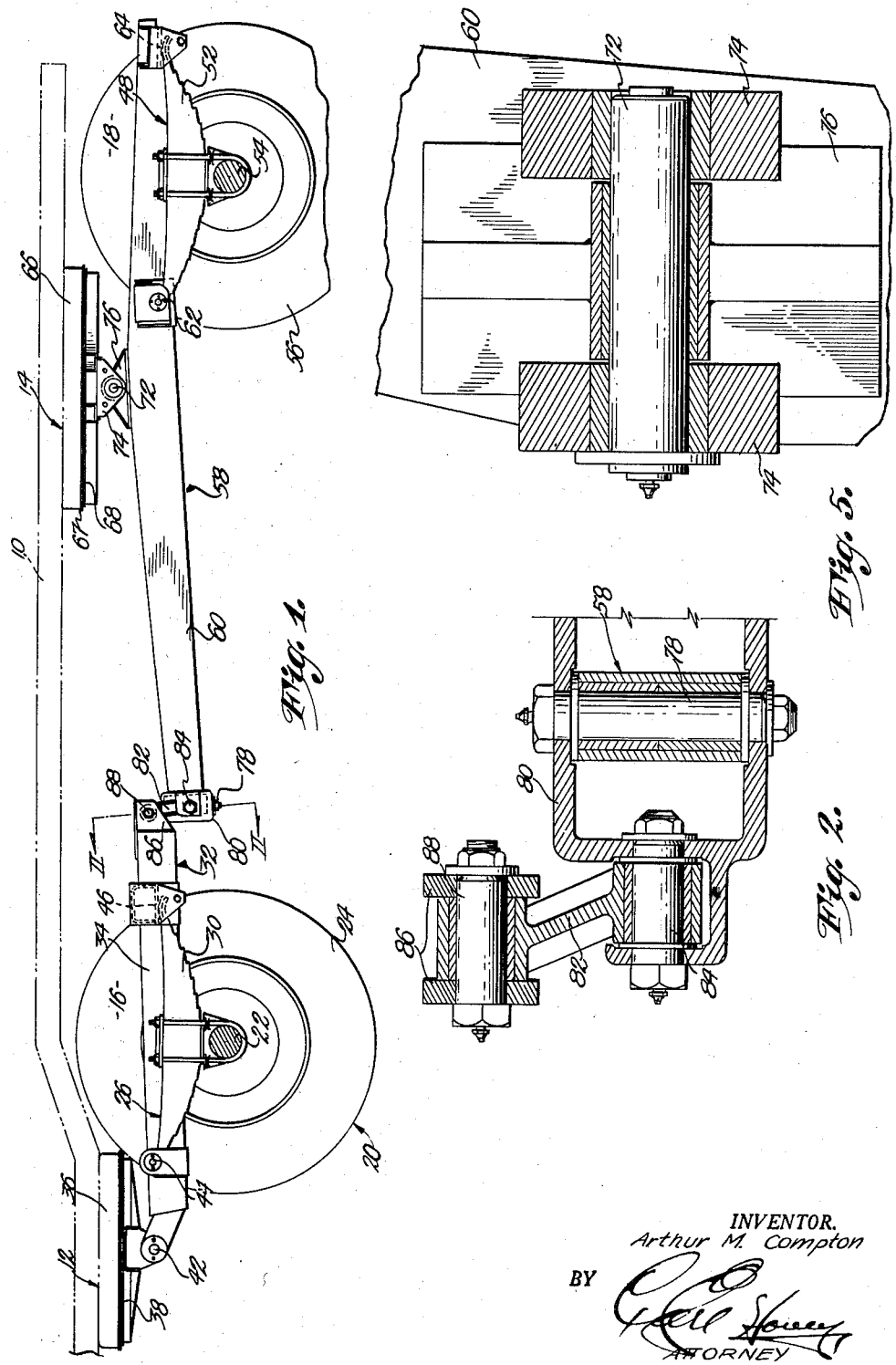
INVENTOR.
Arthur M. Compton
BY
ATTORNEY

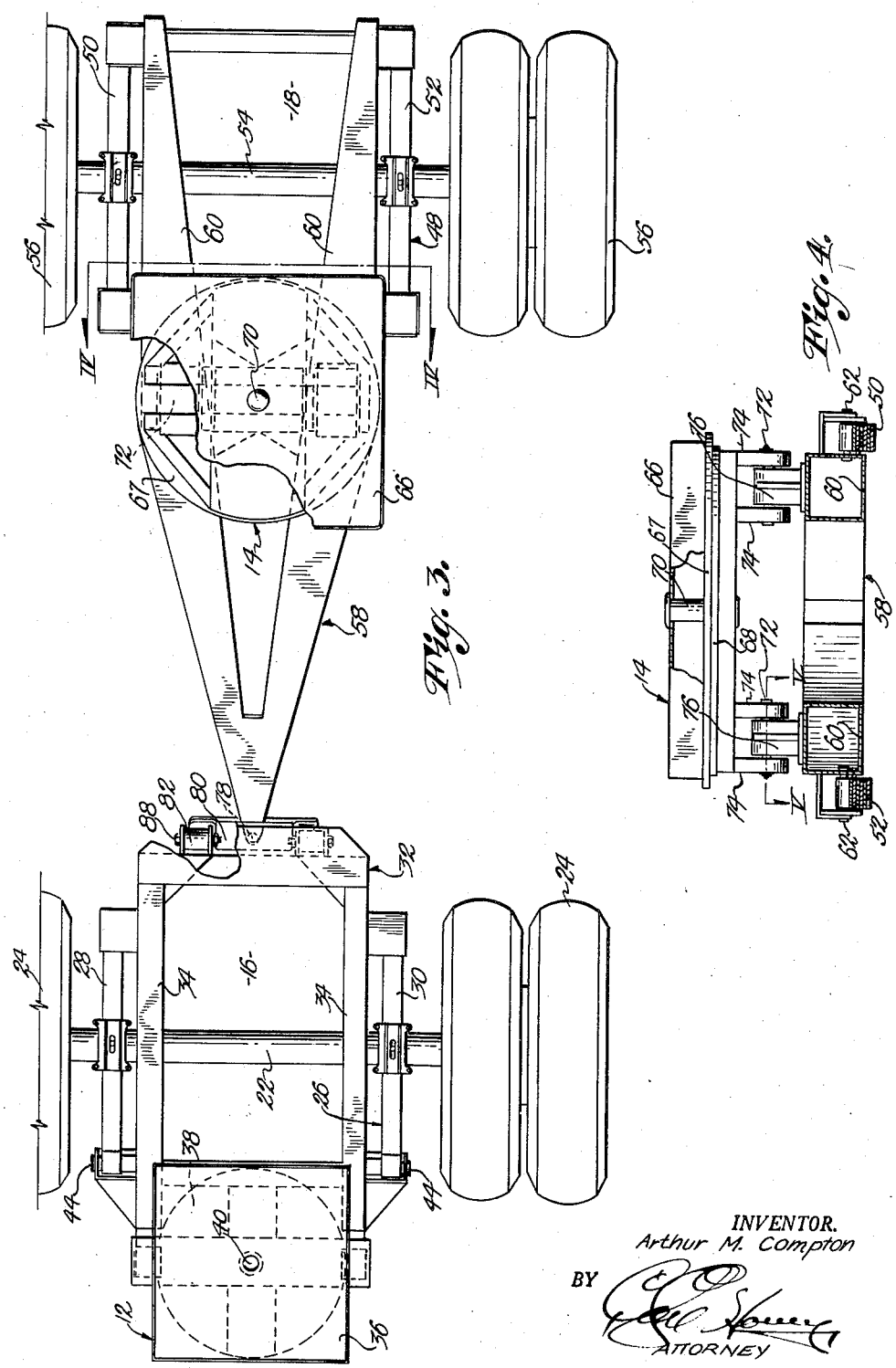

United States Patent Office 2,857,170
Patented Oct. 21, 1958

2,857,170

LIGHT WEIGHT SPREAD TANDEM RUNNING GEAR

Arthur M. Compton, Bethel, Kans., assignor to Standard Steel Works, Inc., North Kansas City, Mo., a corporation of Texas Application October 1, 1956, Serial No. 613,154

2 Claims. (Cl. 280—104.5)

This invention relates to improvements in mobile vehicles, and particularly, in the undercarriage thereof wherein is provided a pair of wheel and axle assemblies arranged in tandem, the primary object being to improve upon the disclosure of my copending application Serial No. 500,392, filed April 11, 1955, now Patent No. 2,784,981, dated March 12, 1957.

It is the most important object of the present invention to provide an undercarriage of the aforementioned character that embodies all of the advantages of my early disclosure above-identified, but which is considerably cheaper to manufacture and relatively light weight as compared with the weight of the assembly contemplated by said copending application.

In my said copending application there is shown a novel undercarriage embodying front and rear spring units formed and arranged in a manner to provide improved steering characteristics as well as equalization of loads, but in order to carry out the concepts of the invention, it becomes necessary to utilize specially formed spring units and, therefore, it is an important object of the present invention to incorporate the same advantages while utilizing conventional standard spring units more readily available on the open market.

A further important object of the instant invention is to provide an undercarriage that is appreciably more sturdy, strong and durable than heretofore disclosed in my copending application, particularly with respect to the springs themselves through utilization of beam structures that absorb the abuse which would otherwise be imparted to the springs when following the teachings of said prior disclosure.

In the drawings:

Figure 1 is a side elevational view of a light weight spread tandem running gear made pursuant to my present invention.

Fig. 2 is an enlarged, fragmentary, detailed, cross-sectional view taken on line II—II of Fig. 1.

Fig. 3 is a fragmentary, top plan view thereof.

Fig. 4 is a cross-sectional view taken on line IV—IV of Fig. 3, parts being broken away for clearness; and Fig. 5 is an enlarged, fragmentary, detailed, cross-sectional view taken on line V—V of Fig. 4.

The trailer, truck, semi-trailer or the like with which the undercarriage or running gear illustrated in the drawings is to be used, has not been shown in the drawings but it is to be understood that the same is normally provided with a main frame 10 that is operably coupled in any suitable manner with a front fifth wheel mount 12 and a rear fifth wheel mount 14. The two mounts 12 and 14 form a part respectively of a front undercarriage broadly designated by the numeral 16, and a rear undercarriage broadly designated by the numeral 18.

The front undercarriage 16 includes a wheel and axle assembly 20 having an axle 22 and ground-engaging wheels 24. A spring unit 26 for the assembly 20 includes a pair of preferably parallel, longitudinally extending, downwardly bowed semi-elliptical leaf spring stacks 28 and 30 resting upon and rigidly attached intermediate the ends thereof to the axle 22.

Spring unit 26 supports polygonal beam structure 32 that includes a pair of interconnected side beams 34 embraced by the spring stacks 28 and 30, the beams 34, as well as the stacks 28 and 30, being parallel with the normal path of travel of the vehicle.

The fifth wheel mount 12 is disposed at the forwardmost end of the beam structure 32 and includes a frame member 36 to which the main frame 10 is attached, together with an underlying plate 38 that is rotatable about a horizontal axis with respect to the frame 36 by virtue of a pivot pin 40 that interconnects the plate 38 with the frame 36. Plate 38 in turn is swingable with respect to the beam structure 32 about a horizontal axis by virtue of pivot pin 42 interconnecting the forwardmost end of the beam structure 32 and the plate 38.

The forwardmost end of the spring unit 26 is connected with the beam structure 32 by a horizontal pivot pin 44, whereas the rearmost ends of the spring stacks 28 and 30 are coupled with the beam structure 32 through use of slide or wear plates 46 carried by beams 34—34 respectively.

The rearmost spring unit 48 includes a pair of spring stacks 50 and 52 which may be of standard lengths identical with the springs 28 and 30 and attached intermediate the ends thereof to rear axle 54 of the under-carriage 18 provided additionally with rear wheels 56. Spring unit 48 supports a rear beam structure 58 in the same manner as beam structure 32 is supported by spring unit 26. To this end, springs 50 and 52 embrace the beam structure 58 and springs 50 and 52 are attached at their forwardmost ends to beams 60 of structure 58 by pivot pins 62. Wear plates 64 on the beams 60 at the rearmost ends of the latter slidably rest upon the rearmost ends of the springs 50 and 52.

Fifth wheel mount 14 includes a frame portion 66 attached to frame 10 and having a plate 67. A pivot plate 68 is attached to frame 66 by a vertical pivot pin 70.

Horizontal pivot pins 72 interconnect the beams 60 intermediate the ends thereof with the pivot plate 68 of the fifth wheel mount 14. Each pin 72 is journaled within a pair of spaced plates 74 rigidly secured to the plate 68 and depending therefrom, as well as within an upstanding lug 76 rigid to the corresponding beam 60 and embraced by the plates 74.

As seen in Fig. 3 of the drawings, the beams 60 converge as the forwardmost ends thereof are approached, the forwardmost end of the beam structure 58 being pivotally connected with the rearmost end of the beam structure 32 by a vertical pin 78. The pin 78 is attached to a cross element 80 intermediate the ends of the latter and a pair of outwardly and upwardly extending links or shackle arms 82 pivotally interconnect the cross element 80 with the rearmost end of the beam structure 32. Horizontal pintles 84 at the ends of the element 80 at the ends of the element 80 receive the lowermost ends of the links 82 and the upper ends of the links 82 are embraced by rearwardly extending ears 86 rigid to the beam structure 32. Horizontal pintles 88 interconnect the links 82 with the ears 86.

It is now apparent that, by virtue of the fact that the rear beam structure 58 is permitted to swing with respect to the front beam structure 32 about vertical pin 78, as well as shift fore and aft with respect to structure 32 through links 82, proper articulation and guiding or steering is effected during swinging movement of the running gears 16 and 18 about horizontal pivot pins 40 and 70. Furthermore, the articulation herein provided permits freedom of relative vertical movement of the running gears 16 and 18 through the series of horizontal pivots 42, 44, 88, 84, 72 and 62, as well as the sliding movement of the springs on plates 46 and 64 and rotative movement of the axles 22 and 54 with their corresponding spring units.

Having thus described the invention what is claimed as new and desired to be secured by Letters Patent is:

1. In a mobile vehicle, a main frame; a front and a rear undercarriage beneath the frame, each provided with a wheel and axle assembly, each axle having a rigid beam structure thereabove including a pair of elongated, rigidly interconnected beams, there being a pair of spaced springs resting upon and rigidly attached intermediate their ends to each axle respectively for swinging movement therewith, each pair of springs embracing a corresponding pair of beams and supporting the latter therebeneath at the ends of the springs; a fifth wheel mount at the forwardmost end of the front beam structure and a fifth wheel mount intermediate the ends of the rear beam structure, each mount including a load-carrying secondary frame secured to the main frame and a member attached to the secondary frame for movement with respect thereto about a vertical axis, each member being connected with its beam structure for movement with respect thereto about a horizontal axis, each fifth wheel mount being disposed forwardly of and above the corresponding pair of springs; and means separate from the mounts and the springs piovtally coupling the forwardmost end of the beam structure of said rear undercarriage with the rearmost end of the beam structure of said front undercarriage for fore and aft movement and for swinging movement about a vertical axis of said rear undercarriage as a unit relative to the front undercarriage.

2. The invention of claim 1, said springs each having pivotal connection with corresponding beam structures at one end of the springs and fore and aft sliding engagement with corresponding beam structures at the opposite ends of the springs.

References Cited in the file of this patent

UNITED STATES PATENTS

| | | |
|---|---|---|
| 1,659,819 | Heymann | Feb. 21, 1928 |
| 2,237,972 | Prazen | Apr. 8, 1941 |
| 2,373,398 | Hoobler | Apr. 10, 1945 |
| 2,460,429 | Oyler | Feb. 1, 1949 |
| 2,493,023 | Pointer | Jan. 3, 1950 |
| 2,662,781 | Hobson | Dec. 15, 1953 |
| 2,784,981 | Compton | Mar. 12, 1957 |